(12) United States Patent
Gurevitz et al.

(10) Patent No.: US 7,593,848 B2
(45) Date of Patent: Sep. 22, 2009

(54) AUTO-CORRELATORS WITH DC AND CW CANCELLATION

(75) Inventors: Assaf Gurevitz, Tel Aviv (IL); Uri Perlmutter, Holon (IL)

(73) Assignee: Intel Corporation, Santa Clara, CA (US)

(*) Notice: Subject to any disclaimer, the term of this patent is extended or adjusted under 35 U.S.C. 154(b) by 511 days.

(21) Appl. No.: 11/529,061

(22) Filed: Sep. 28, 2006

(65) Prior Publication Data
US 2008/0079627 A1   Apr. 3, 2008

(51) Int. Cl.
*G10L 19/12* (2006.01)

(52) U.S. Cl. ............ 704/223; 704/226; 704/217

(58) Field of Classification Search .......... 704/200, 704/216, 217, 218, 220, 226, 223, 228; 375/346, 375/222

See application file for complete search history.

(56) References Cited

U.S. PATENT DOCUMENTS 6,498,820 B1 * 12/2002 Thomson et al. ............ 375/346

* cited by examiner

*Primary Examiner*—Huyen X. Vo
(74) *Attorney, Agent, or Firm*—Lee & Hayes, PLLC.

(57) ABSTRACT

Embodiments of methods and means for correcting auto-correlated wireless signal samples are provided. Such embodiments include isolating and subtracting an interference vector from auto-correlated signal samples so that a corrected signal sample data set is derived. The corrected signal samples are then used in detecting and identifying symbols within the original wireless signal. Reliable and expeditious wireless communications can be achieved in accordance with the present embodiments.

14 Claims, 4 Drawing Sheets

AUTO-CORRELATORS WITH DC AND CW CANCELLATION

BACKGROUND

Classic auto-correlation techniques are applied in order to detect symbols and/or other meaningful information in a corresponding data stream. Auto-correlation is performed between a presently received wireless signal and a delayed (sampled) version of that signal stored in memory. Generally, such auto-correlation techniques exploit the periodicity structure of the wireless signal during acquisition of an orthogonal frequency-division multiplexing access (OFDMA) signal. In particular, such cyclic prefix based auto-correlators are used during acquisition of a WiMAX downlink signal, as one non-limiting example. As used herein, "WiMAX" and "802.16" respectively refer to signaling standards as defined by the Institute of Electrical and Electronics Engineers (IEEE), Inc., Piscataway, N.J., USA. In particular, the term "WiMAX" refers to IEEE standard 802.16e, as defined in year 2005. The signal periodicity of interest stems from the presence of a cyclic prefix guard interval inherent to the signaling protocol (e.g., WiMAX, 802.16, etc.). In such a case, the distance between correlated signal samples is one orthogonal frequency-division multiplexing access symbol interval, excluding the guard interval.

However, a problem is known to exist under classical auto-correlation strategies. Interference can render the reliable identification of symbols within the received and acquired wireless signal difficult, or in extreme cases, impossible. Various forms of interference as of concern here can be classified as either continuous wave (CW) or direct current (DC) in nature. Continuous wave interference is generally in the form of a constant (or intermittent) radio frequency carrier having no modulation, or modulation that is inconsequential with respect to the sought-after signal (e.g., a WiMAX or 802.16 down link signal, etc.). Direct current interference is typically in the form of a constant, non-oscillating electromagnetic field. In any case, classical auto-correlation of such interference-laden signal samples can result in an unwanted bias that fouls symbol detection and/or identification, rendering wireless communication under the situation difficult, impossible, or unreasonably slow as multiple signaling attempts are required.

DETAILED DESCRIPTION

Underlying Concepts

Classic auto-correlation techniques are well known and are used during radio frequency signal acquisition and subsequent symbol detection. These classic techniques can yield problematic and sometimes unusable results when operating in relatively low signal-to-noise ratio environments. Such problems associated with classic auto-correlation procedures are usually compounded when sources of interference are present. Solutions to these problems are desirable and contemplated by the subject matter herein.

An improved auto-correlation algorithm is represented as:

$$y[n] = \frac{\sum_{k=0}^{N-1} \sum_{j=0}^{CP-1} x[n - j - k \cdot (NFFT + CP)] \cdot x[n - j - k \cdot (NFFT + CP) - NFFT]^*}{Power} \quad (Eq.\ 1)$$

wherein: $x[n]$ is an incoming signal sample, CP is the length of a cyclic prefix, N is the number of symbols, and NFFT is the FFT size (also being the distance between correlated signal samples).

Equation 1 above improves the classical auto-correlator by "overlapping and adding" the results with a symbol length modulo. This approach improves the signal-to-noise ratio (SNR) of the auto-correlator results by a factor equal to the number of summed (i.e., accumulated) symbols. The numerator of Equation 1 expresses the auto-correlation operation, whereas the denominator expresses normalization by energy (i.e., power) of the signal samples.

Results of this improved auto-correlation operation—referred to as "overlap-and-add" symbols (or values)—are stored in a memory of (NFFT+CP) samples. Such a memory (or other suitable storage) as just discussed is referred to herein as an "overlap-and-add memory". A search is then performed over the memory to identify a maximum absolute peak, as compared to a predetermined passing threshold, in order to validate the present of a signal. Frequency estimation may be performed by way of the angle of the auto-correlation peak (i.e., the peak or maximum within the auto-correlated signal sample data set).

Figure 1:
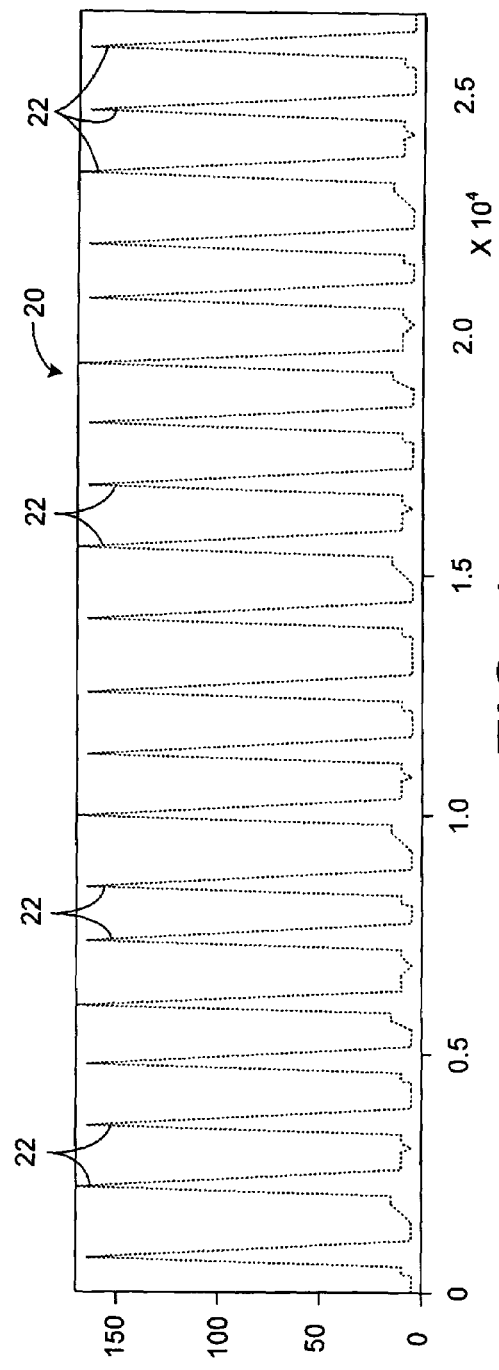
FIG. 1 illustrates a signal diagram in accordance with one exemplary operating environment.

Consideration is given to FIG. 1, which depicts an exemplary signal diagram 20. The diagram 20 illustrates twenty orthogonal frequency-division multiplexing access symbols 22 within a single frame. The symbols 22 are depicted in favorable signal-to-noise ratio conditions, and with little or no interference present. FIG. 1 is understood to represent a sequential diagram of auto-correlator output without overlap-and-add.

Figure 2:
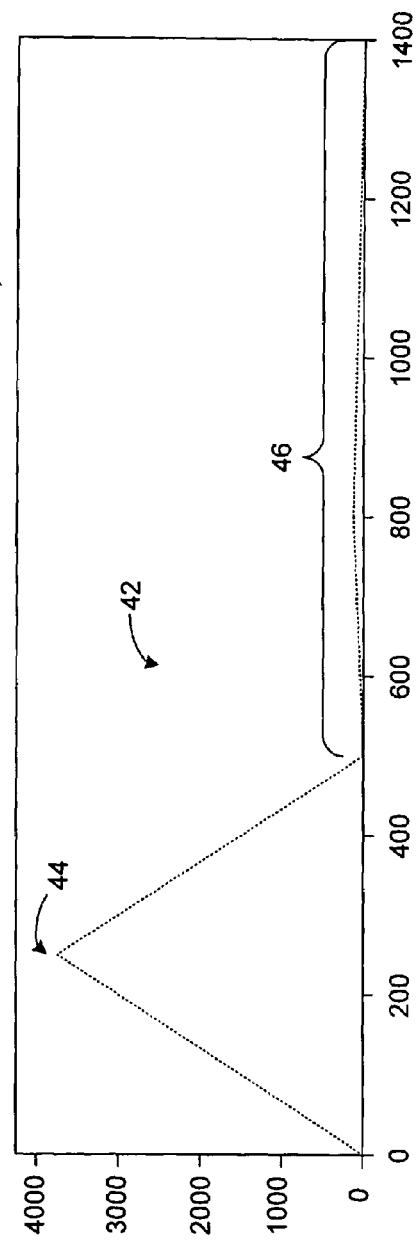
FIG. 2 illustrates a signal diagram in accordance with another operating environment.

Consider now FIG. 2, which depicts another exemplary signal diagram 40. The diagram 40 includes a plurality of auto-correlated signal samples (or data points) 42 that have been derived using overlap-and-add technique consistent with Equation 1 above. Typically, the auto-correlated samples (i.e., data) 42 would be resident in a memory or other storage of a device configured to perform the overlap-and-add auto-correlation procedure.

In any case, the diagram 40 of FIG. 2 illustrates a summation of twenty auto-correlations per symbol, wherein the cyclic prefix length is two hundred fifty-six samples. The samples 42 of diagram 40 include a peak 44, as well as a zone of samples 46 exemplary of substantially lesser correlated value (essentially zero). The data 42 of FIG. 2 is typical of a WiMAX signal acquisition performed in a generally ideal, low-noise environment.

When continuous wave interference is present in a signal acquisition setting, the received signal may be represented as:

$$y[n] = x[n] + e^{j2\pi \Delta f n} + v[n] \quad (Eq.\ 2)$$

wherein: y[n] is the received signal sample, x[n] is a transmitted signal and v[n] is an additive (unwanted) noise. Direct current interference is a special case, wherein Δf=0. Auto-correlation under these interference-laden circumstances renders a result that may be expressed as:

$$A[n] = \sum_{l=0}^{CP-1} y[n-1] \cdot y[n-l-NFFT]^* \quad \text{(Eq. 3)}$$
$$= \sum_{l=0}^{CP-1} x[n-l] \cdot x[n-l-NFFT]^* +$$
$$\sum_{l=0}^{CP-1} e^{j2\pi\Delta f \cdot NFFT} + \text{noise}$$

wherein: y[n] and x[n] are as defined above in regard to Equation 2, and CP and NFFT are as defined above in regard to Equation 1.

It is noted that the second term of Equation 3 above, specifically:

$$\sum_{l=0}^{CP-1} e^{j2\pi\Delta f \cdot NFFT}; \quad \text{(Ex. 1)}$$

is a vector with an angle of (2πΔf·NFFT), and an amplitude of CP. This vector is referred to herein as an interference vector. The interference vector, if not removed, adds a bias to the auto-correlation peak and angle, and may damage both frequency estimation and signal validation performance, as these are typically done.

The interference vector (Expression 1) is constant and is added to the auto-correlation frame at every sample n=0, 1, 2, ..., (NFFT+CP−1). If this interference vector could be subtracted from the overlap-and-add memory, the unwanted bias would be removed and the interference problems attributable thereto would be solved. Attention is now directed to such solutions.

Exemplary Methods

Figure 3:
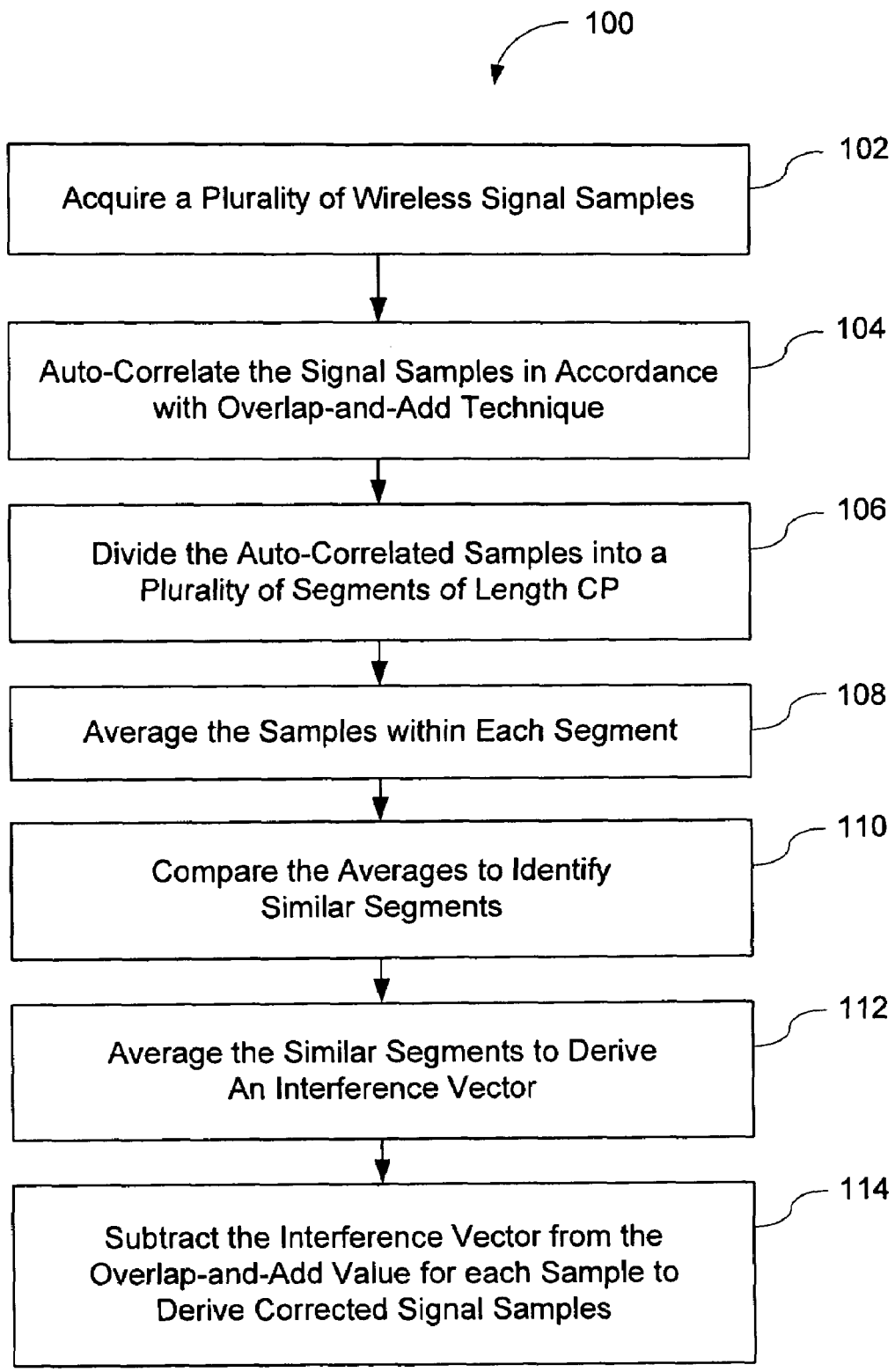
FIG. 3 illustrates a process flow diagram in accordance with one embodiment.

FIG. 3 is a flowchart 100 that describes a method in accordance with one embodiment. While the flowchart 100 describes particular methodical acts and order of execution, it is to be understood that the method of flowchart 100 is contemplated to be suitably varied, broadly applicable, and is not limited as specifically presented. Thus, other embodiments contemplated herein may be configured and/or performed wherein selected acts represented by the flowchart 100 are modified and/or omitted, and/or other acts not specifically depicted therein are executed.

At 102, a plurality of wireless signal samples is acquired by known acquisition techniques. The source wireless signal is presumed to be a WiMAX protocol signal, but other signal sources may also be used in accordance herewith. Such acquisition techniques typically include analog-to-digital conversion by known means, etc. In any case, a plurality of discrete data samples is derived by way of the acts at 102.

At 104, the acquired signal samples are auto-correlated in accordance with overlap-and-add technique. In one embodiment, this auto-correlation is performed consistent with Equation 1 above. In another embodiment, another suitable auto-correlation procedure is applied. The results of the overlap-and-add auto-correlation are maintained as values in a memory (not shown) or other storage media, wherein each value corresponds to an acquired signal sample.

At 106 of FIG. 3, the auto-correlated samples (i.e., values) within the memory, also referred to as a memory picture, are divided into a plurality of segments of CP length each. CP, as used here and above, is the cyclic prefix length of the symbols represented by (i.e., essentially, encoded within) the acquired signal samples. Typically, several segments are derived by this act. Such division into segments is performed with the understanding that one, or a maximum of two, of the segments will include the auto-correlation peak (e.g., 44 of FIG. 2) and that all other segments will include the interference vector plus noise.

At 108, the sample values within each segment are averaged. Thus, a plurality of averages is derived in count-correspondence with the number of segments. It has been discovered that an average over a segment that includes only the interference vector will result in the interference vector plus noise, whereas the average of the segment(s) including the peak will contain a different result. The averages are characterized by an angle and amplitude as described above in regard to interference vector Expression 1.

At 110 of FIG. 3, the averages from 108 above are compared. Specifically, the angle and amplitude of each segment average is compared to those of the other segments. Also, a predetermined threshold value is used in the comparison in order to identify (or designate) two or more of the segments as being "similar". A plurality of similar segments is thus defined—typically, all but the one or two segments corresponding to the peak auto-correlated value. Those segments identified as similar comprise the interference vector (e.g., Expression 1) corresponding to the continuous wave and/or direct current interference borne by the original signal samples.

At 112, an additional averaging of the similar segments identified at 110 above is done in order to isolate, or derive the interference vector (i.e., angle and amplitude) specifically effecting the signal sample data set under scrutiny. Also, this additional averaging step tends to reduce noise content within the auto-correlated samples of the similar segments.

At 114, the interference vector, as derived at 112 above, is subtracted from each of the overlap-and-add memory values corresponding to the original signal sample set. This subtraction step removes the bias present in the auto-correlated signal samples and solves the impairment introduced by the original continuous wave and/or direct current interference. At this point, a plurality of corrected signal samples has been derived, wherein the effects of the original interference have been mitigated.

It is anticipated herein that the method of the flowchart 100, or other embodiments contemplated under these teachings, may be implemented by way of a variety of means. In one non-limiting example, a computer-readable media comprises a program code that causes a processor, or plurality of processors, to effect (i.e., cause) corrective procedures on auto-correlated signal samples so as to derive corrected signal sample data. In another non-limiting example, auto-correlated signal samples are corrected by way of a suitably configured electronic circuit. In yet another example, one or more integrated circuit devices are configured so as to correct auto-correlated signal samples in accordance with the present procedures. In still another example, a system includes a device configured to correct auto-correlated signal sample data in accordance with the embodiments presented herein. These and any number of other suitable means may be configured and used to derive corrected, auto-correlated signal samples by way of the methods presented herein.

Hypothetical Example

In the interest of understanding, a hypothetical application case is now considered. For purposes of example, assume that a WiMAX signal has been acquired and auto-correlated wherein NFFT (the distance between auto-correlated signal samples)=1024, and CP (the cyclic prefix length)=256. It is further assumed for sake of example that a transmitted signal is frequency shifted by Δf=0.4 of the sub-carrier spacing as compared to the received signal. Further assume that a direct current (DC) interferer with an equal root mean square (RMS) level is present. In this exemplary case, the received signal may be written as:

$$y[n]=x[n] \cdot e^{j2\pi 0.4/NFFT \cdot n}+DC+v[n] \quad \text{(Eq. 4)}$$

wherein: y[n], x[n] and NFFT are as defined above in regard to Equations 1 and 2, and v[n] is an additive Gaussian noise.

In reference to exemplary Equation 4 above, the angle of the auto-correlation peak is used to extract the frequency deviation, which is equal to 0.4 is this case. The interference vector is subtracted by averaging over three segments of two hundred fifty-six samples each.

Figure 4:
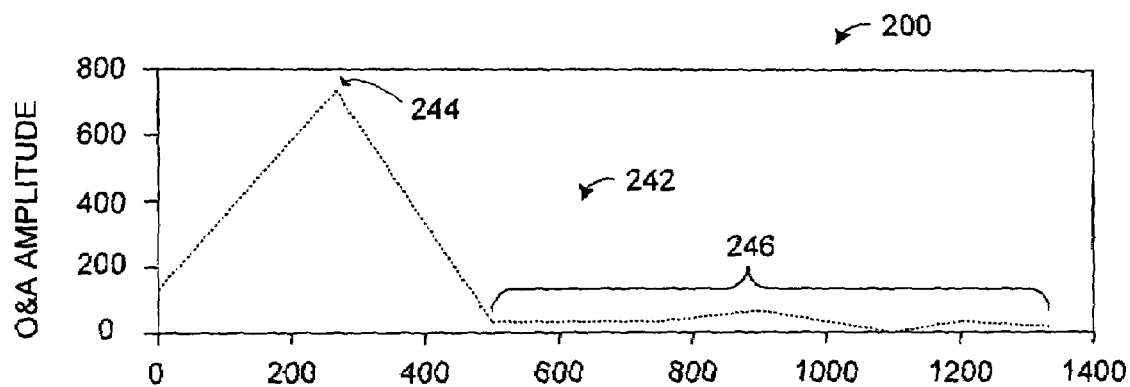
FIG. 4 illustrates an exemplary signal diagram in accordance with one embodiment.

FIG. 4 depicts a signal diagram 200 in accordance with one embodiment. The diagram 200 shows the results of overlap-and-add auto-correlation after subtracting the averaged (i.e., derived) interference vector over the three segments corresponding to the hypothetical example introduced above. The diagram 200 includes a plurality of corrected, auto-correlated signal samples 242, an auto-correlation peak 244, and a zone 246 of near-zero auto-correlated samples, all plotted as respective amplitude values. As depicted, the diagram 200 illustrates a corrected auto-correlated sample data set that comprises virtually no effects from the direct current interference vector of the hypothetical example above.

Figure 5:
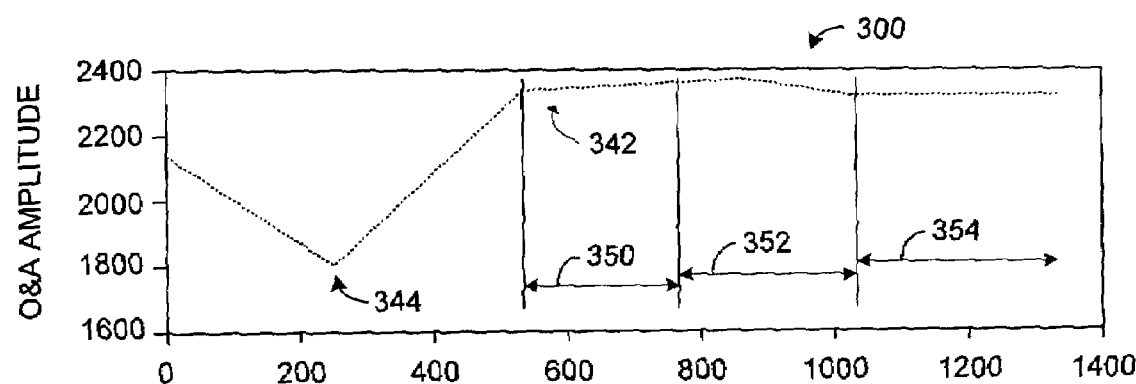
FIG. 5 illustrates an exemplary signal diagram according to known techniques.

FIG. 5 depicts a signal diagram 300 in accordance with auto-correlation techniques not inclusive of the corrective procedures contemplated herein (i.e., method of the flowchart 100 of FIG. 3, etc.). The diagram 300 includes a plurality of auto-correlated signal samples 342 plotted as respective amplitude values, wherein the effects of the hypothetical direct current interference vector are present. It is noted that the peak auto-correlation value 344 is greatly attenuated, while sample 342 values within the three segments 350, 352 and 354 are actually boosted. Thus, an undesired outcome has been realized and the direct current interference has essentially ruined the auto-correlated signal sample set of diagram 300. Under such conditions, identification of a preamble symbol, data symbols, etc., within the auto-correlated samples 342 would be very difficult or impossible.

Figure 6:
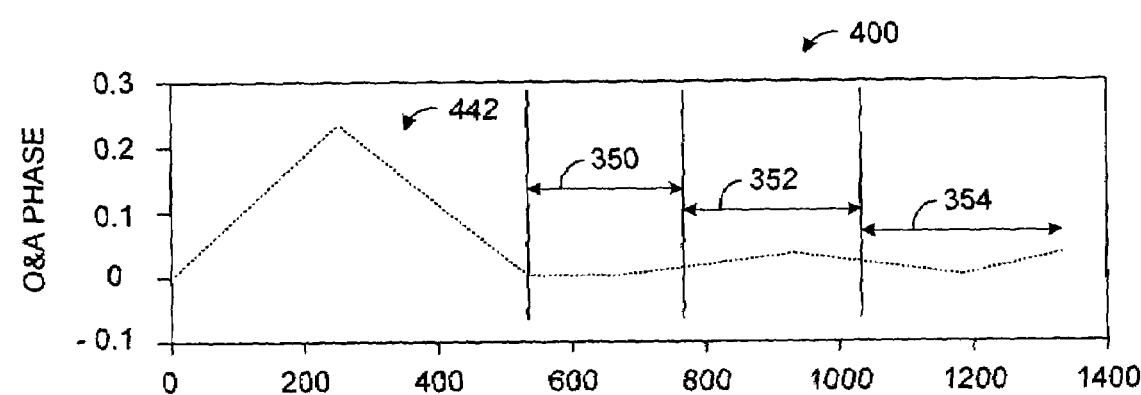
FIG. 6 illustrates an exemplary signal diagram corresponding to FIG. 5.

FIG. 6 depicts a signal diagram 400 corresponding to the diagram 300 of FIG. 5. FIG. 6 includes a plurality of auto-correlated signal samples 442 plotted as respective phase values. The diagram 400 includes the three segments 350, 352 and 354 in time-synchronization to those of FIG. 5. As depicted the signal samples 442 have not been corrected in accordance with the procedures contemplated herein. The phasing information of the auto-correlated signal samples 442 is indicative of the direct current interference of the hypothetical example presented above. This phasing information is exploited by the present embodiments when averaging the sample data so as to isolate the interference vector.

When the respective diagrams of FIGS. 4, 5 and 6 are compared, it is apparent that the procedures contemplated herein perform well to correct overlap-and-add auto-correlated signal samples so that peak data is not subject to attenuation, and the effects of interference are mitigated (i.e., cancelled). The corrected data enables reliable symbol detection within the original wireless signal stream, resulting in stable and expeditious communication.

Exemplary System

Figure 7:
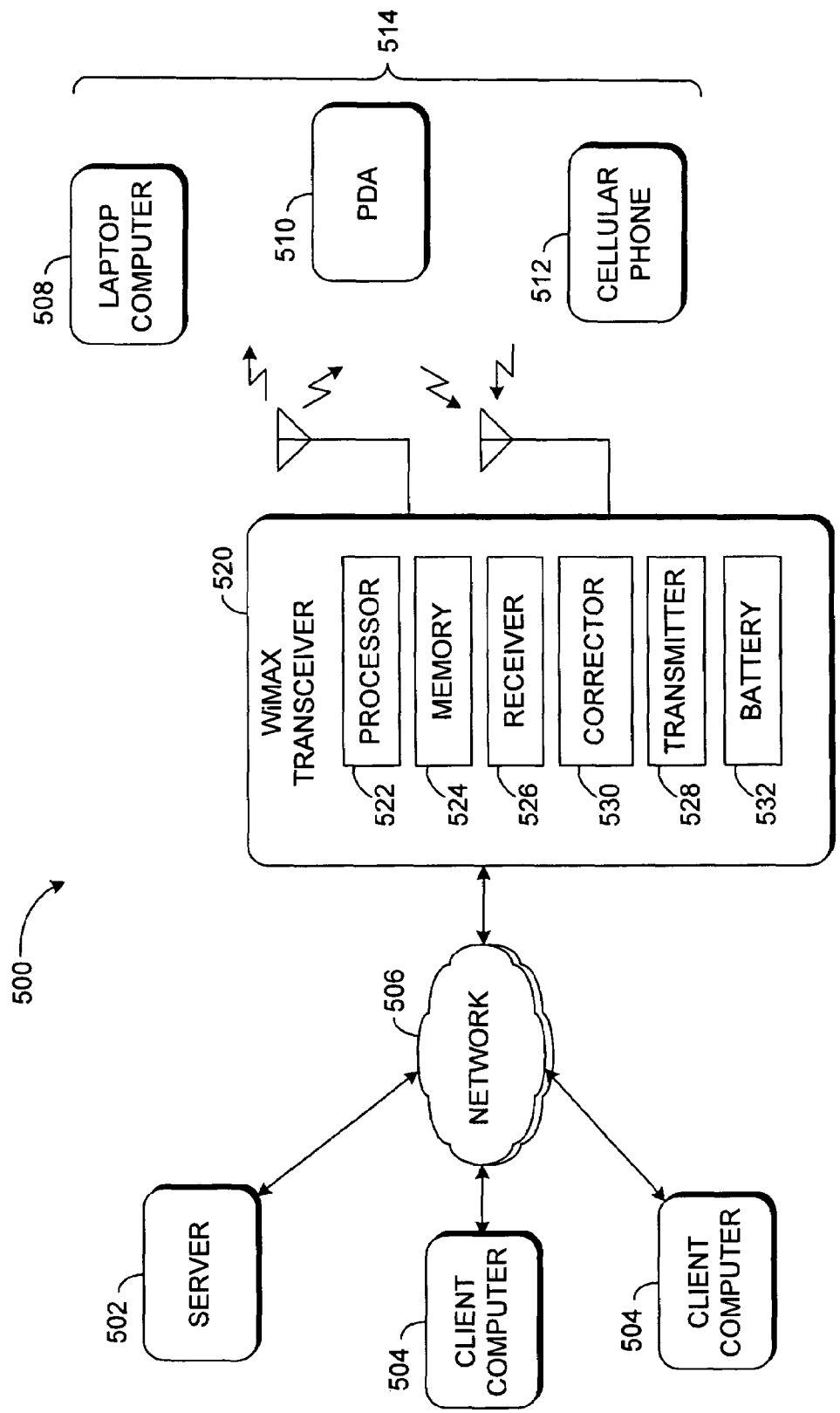
FIG. 7 illustrates a system in accordance with one embodiment.

FIG. 7 depicts an exemplary system 500 according to another embodiment. System 500 is intended to exemplify but one of any number of possible systems inclusive of means and/or methods provided herein. Thus, the example system 500 is understood to be illustrative and non-limiting in its overall teachings.

The system 500 includes a server 502 and a plurality of client computers 504. The server 502 and client computers 504 are respectively defined and operative in any suitable known way. Thus, the server 502 and clients 504 are understood to be broadly applicable to any number of respective tasks. The system 500 also includes a network 506. The server 502 and the client computers 504 are coupled to, and are in communication with each other by way of, the network 506. The network 506 may be defined by any suitable known network topology including, but not limited to, a local-area network (LAN), a wide-area network (WAN), etc. Furthermore the network 506 may be defined by or in communication with the Internet.

The system 500 may further include a laptop computer 508, a personal digital assistant (PDA) 510 and/or a cellular phone 512. Each of the elements 508, 510 and 512 is respectively defined and configured in accordance with known topologies. For purpose herein, the laptop 508, PDA 510 and cellular phone 512 are understood to include bidirectional wireless communication functionality in accordance with WiMAX 802.16 protocols. Thus, the laptop computer 508, personal digital assistant 510 and cellular phone 512 are collectively referred to as wireless devices 514.

As also depicted in FIG. 7, the system 500 includes a WiMAX transceiver 520, coupled in communication with the network 506. The transceiver 520 includes a processor 522, a memory 524, a receiver 526, a transmitter 528 and a battery 532. The battery 532 is electrically coupled to one or more of the elements 522-528. Various respective functions of the receiver 526 and the transmitter 528 are under the control of the processor 522. In turn, the processor 522 executes one or more program codes (not explicitly shown) stored either internally and/or within the memory 524. Thus, the elements 522-528 of the transceiver 520 are electrically coupled so as to function as a cooperative entity.

The transceiver 520 further includes corrector 530 functionality. The corrector may be coupled to the battery 532 as desired. The corrector 530 is implemented and configured consistent with the balance of the transceiver 520 functions so as to correct overlap-and-add auto-correlation data consistent with such procedures as described above. In one embodiment, the corrector 530 is provided as a program code (storable within memory 524, etc.) executable by the processor 522. In another embodiment, the corrector 530 is implemented as a dedicated-function electronic circuit within the transceiver 520. In yet another embodiment, the corrector 530 is provided as a program code on computer readable media such as, for example, floppy disk, CD-ROM, swappable/installable firmware, etc., and is downloaded to/installed within the transceiver 520. In one or more embodiments, the corrector 530 is an integral portion of the auto-correlation means of the transceiver 520. In any event, the corrector 530 may be implemented within the transceiver 520 by way of these and any number of other suitable means, and exhaust elaboration is not required for purposes herein.

The exemplary system 500 of FIG. 7 typically operates as follows. Any of the server 502, client computers 504 and/or wireless devices 514 may communicate and cooperate by way of WiMAX-complient radio frequency signaling. It is assumed, for purposes of this example, that the processor 522 executes a corresponding program code (not shown) so as to perform overlap-and-add auto-correlation on acquired WiMAX wireless signals, storing the auto-correlated signal samples in memory 524. The transceiver 520 then utilizes the corrector 530 to correct the auto-correlated signal samples stored in memory 524 in accordance with the procedures herein. In one non-limiting embodiment, the corrector 530 is configured to perform the method of the flowchart 100 of FIG. 3. In any case, corrected auto-correlation signal samples are derived by way of the corrector 530.

In one non-limiting example, the transceiver 520 is able to readily and efficiently identify and process WiMAX wireless signals during an Internet surfing session by the laptop computer 508 in the presence of a direct current interference source. In another non-limiting example, the corrector 530 enables the transceiver to detect preamble symbols within wireless signals transmitted by the personal digital assistant 510, despite a continuous wave interference source (not shown) in near proximity to the transceiver 520. These and countless other operational scenarios may be performed by the system 500, wherein the corrector 530 of the transceiver 520 serves to expedite and improve the reliability of WiMAX wireless communications by mitigating the effects of continuous wave and/or direct current interferences.

CONCLUSION

Embodiments and methods presented herein provide solutions to problems encountered during known auto-correlation of wireless signals samples, such as those acquired from orthogonal frequency-division multiplexing access signals, WiMAX signals, IEEE 802.16-compliant signals, etc. Generally, interference from continuous wave and/or direct current interference sources is cancelled, or removed, by way of new signal sample correction techniques. These techniques provide for improved auto-correlators that exploit cyclic prefix redundancy of a WiMAX (or other) signal, yielding corrected results over known methods and means.

In turn, significantly enhanced performance can be realized in cases where overlap-and-add auto-correlation; is use during acquisition of a WiMAX signal. Such improved performance applies to both signal acquisition and frequency estimation. Additionally, the present embodiments can measurably simplify hardware implementation costs. This improved performance speeds communication between wireless entities, as symbol detection failures and/or the need to repeat packet transmissions is essentially eliminated.

Although the embodiments have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

What is claimed is:

1. A method, comprising:
   using a computer to:
      divide a plurality of auto-correlated signal samples into a plurality of segments of a cyclic prefix length each, each auto-correlated signal sample corresponding to a value;
      analyze the plurality of auto-correlated signal samples to identify an interference vector, wherein the analysis of the plurality of auto-correlated signal samples comprises using the computer to:
         average the plurality of auto-correlated signal samples within each segment to derive a plurality of averages;
         compare an angle and an amplitude of each average with a predetermined threshold; and
      subtract the interference vector from each of a plurality of values to derive a plurality of corrected signal samples.

2. The method of claim 1, wherein the plurality of auto-correlated signal samples has been acquired by way of an overlap-and-add auto-correlation technique.

3. The method of claim 1, wherein the interference vector corresponds to at least one of a continuous wave interference source, or a direct current interference source.

4. An apparatus, comprising:
   an electronic circuit configured to:
      divide a plurality of auto-correlated signal samples into a plurality of segments, each auto-correlated signal sample corresponding to a value in an overlap-and-add memory;
      identify a plurality of similar segments;
      average the plurality of similar segments to derive an interference vector; and
      subtract the interference vector from each of the values within the overlap-and-add memory to derive a plurality of corrected signal samples.

5. The apparatus of claim 4, wherein the electronic circuit is further configured to identify the plurality of similar segments by way of:
   averaging the plurality of auto-correlated signal samples within each segment to derive a plurality of averages; and
   comparing an angle and an amplitude of each average with a predetermined threshold.

6. The apparatus of claim 4, wherein the electronic circuit is further configured to divide the plurality of auto-correlated signal samples such that each segment is of a cyclic prefix length.

7. The apparatus of claim 4, wherein the electronic circuit is further configured such that the interference vector corresponds to at least one of a continuous wave interference source, or a direct current interference source.

8. A computer readable storage media including a program code, the program code configured to cause one or more processors to:
   divide a plurality of auto-correlated signal samples into a plurality of segments, each auto-correlated signal sample corresponding to a value in an overlap-and-add memory;
   identify a plurality of similar segments;
   average the plurality of similar segments to derive an interference vector; and
   subtract the interference vector from each of the values within the overlap-and-add memory to derive a plurality of corrected signal samples.

9. The computer readable storage media of claim 8, wherein the program code is further configured to cause the one or more processors to identify the plurality of similar segments by way of:
   averaging the plurality of auto-correlated signal samples within each segment to derive a plurality of averages; and
   comparing an angle and an amplitude of each average with a predetermined threshold.

10. The computer readable storage media of claim 8, wherein the program code is further configured to cause the one or more processors to divide the plurality of auto-correlated signal samples such that each segment is of a cyclic prefix length.

11. The computer readable storage media of claim 8, wherein the program code is further configured such that the interference vector corresponds to at least one of a continuous wave interference source, or a direct current interference source.

12. A system, comprising:
a battery; and
a device coupled to the battery, the device configured to:
   derive a plurality of signal samples from one or more radio frequency wireless signals;
   auto-correlate the plurality of signal samples, wherein each auto-correlated signal sample corresponds to a value in an overlap-and-add memory;
   divide the plurality of auto-correlated signal samples so as to define a plurality of segments, wherein each segment is of a cyclic prefix length;
   identify a plurality of similar segments;
   average the plurality of similar segments to derive an interference vector; and
   subtract the interference vector from each of the values within the overlap-and-add memory to derive a plurality of corrected signal samples.

13. The system of claim 12, wherein the device is further configured to identify the plurality of similar segments by way of:
   averaging the plurality of auto-correlated signal samples within each segment to derive a plurality of averages; and
   comparing an angle and an amplitude of each average with a predetermined threshold.

14. The system of claim 12, wherein the device is further configured so as to mitigate interference from at least one of a continuous wave interference source, or a direct current interference source within the corrected signal samples.

* * * * *